United States Patent
Garg

(10) Patent No.: US 8,599,707 B2
(45) Date of Patent: Dec. 3, 2013

(54) POWER BASED CONTENT MODIFICATION, TRANSMISSION, AND CACHING

(75) Inventor: Dinesh K. Garg, San Digeo, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 286 days.

(21) Appl. No.: 12/949,300

(22) Filed: Nov. 18, 2010

(65) Prior Publication Data

US 2012/0131145 A1 May 24, 2012

(51) Int. Cl.
- *H04L 12/26* (2006.01)
- *G08C 17/00* (2006.01)
- *H04W 4/00* (2009.01)
- *H04W 72/00* (2009.01)
- *H04B 15/00* (2006.01)
- *H04B 1/16* (2006.01)
- *G06F 12/08* (2006.01)

(52) U.S. Cl.
USPC ........... 370/252; 370/311; 370/332; 370/338; 455/452.2; 455/522; 455/343.2; 711/3

(58) Field of Classification Search
USPC .......... 709/203, 219; 370/311, 252, 332, 338; 455/452.2, 522, 343.2; 711/3
See application file for complete search history.

(56) References Cited

U.S. PATENT DOCUMENTS

| | | | | |
|---|---|---|---|---|
| 7,010,329 B2 * | 3/2006 | Livet et al. | ..................... | 455/574 |
| 7,242,406 B2 * | 7/2007 | Robotham et al. | ............. | 345/581 |
| 7,280,810 B2 * | 10/2007 | Feher | .............................. | 455/137 |
| 7,499,878 B2 * | 3/2009 | Janakiraman et al. | ..... | 705/14.73 |
| 7,610,495 B2 * | 10/2009 | Azadet et al. | .................. | 713/300 |
| 7,912,478 B2 * | 3/2011 | Takayanagi et al. | ........ | 455/452.2 |
| 7,967,212 B1 * | 6/2011 | Euler et al. | ............... | 235/472.01 |
| 8,392,737 B2 * | 3/2013 | Sharma et al. | ................ | 713/324 |
| 2007/0078964 A1 * | 4/2007 | East et al. | ...................... | 709/224 |
| 2007/0094519 A1 * | 4/2007 | Yamamoto | .................... | 713/300 |
| 2008/0049755 A1 * | 2/2008 | Gannon et al. | .............. | 370/395.1 |
| 2008/0253311 A1 * | 10/2008 | Jin | ................. | 370/311 |
| 2009/0023454 A1 * | 1/2009 | MacInnis et al. | .......... | 455/452.2 |
| 2010/0093319 A1 * | 4/2010 | Sherman | .................... | 455/414.1 |
| 2010/0106770 A1 * | 4/2010 | Taylor et al. | .................. | 709/203 |
| 2010/0179980 A1 * | 7/2010 | Montesdeoca | ................ | 709/203 |
| 2010/0304794 A1 | 12/2010 | Beninghaus et al. | | |
| 2011/0072378 A1 * | 3/2011 | Nurminen et al. | ............ | 715/771 |
| 2011/0116427 A1 * | 5/2011 | Chang et al. | .................. | 370/311 |
| 2011/0184936 A1 * | 7/2011 | Lymberopoulos et al. | ... | 707/721 |
| 2011/0270959 A1 * | 11/2011 | Schlusser et al. | ............. | 709/223 |

\* cited by examiner

*Primary Examiner* — Alpus H Hsu
*Assistant Examiner* — Anthony Luo
(74) *Attorney, Agent, or Firm* — Neugeboren O'Dowd PC

(57) ABSTRACT

Methods and apparatus for operating a mobile device based upon a power capability of the mobile device are disclosed. In one embodiment, the mobile device includes a network selection component configured to select a particular transceiver for communication based upon the power capability of the mobile device and a quality of service associated with available networks. In addition, a cache management component is configured to increase, based upon an indication of the power capability of the mobile device, a size of the cache that is available for requested content so as to increase the likelihood that subsequent requests for the content will be loaded from the mobile device. Moreover, some variations of the mobile device are capable of providing an indication of a power capability of the mobile device to a remote server so the remote server may modify the requested content based upon the power capability.

18 Claims, 8 Drawing Sheets

POWER BASED CONTENT MODIFICATION, TRANSMISSION, AND CACHING

FIELD OF THE INVENTION

The present invention relates to mobile communication devices. In particular, but not by way of limitation, the present invention relates to apparatus and methods for managing power and network communications on mobile communication devices.

BACKGROUND OF THE INVENTION

Mobile communication devices including devices such as smartphones, netbooks, gaming devices, PDAs, and laptop computers are now ubiquitous. A common and ongoing issue with these types of devices is power management. More specifically, these types of devices continue to develop more advanced processing resources, displays, and communication systems that demand more and more power.

In addition to the components on mobile communication devices creating increasing power demands, users' desire to wirelessly communicate (e.g., by voice and/or data) over a wide range of urban and rural geographical areas has also created power demands. And wireless network providers (e.g., carriers and hotspot providers) have responded to this user demand (and created even more demand) by deploying a wide variety of networks that are distributed all over the world. As a consequence of the expansive wireless network coverage that has developed, users now rely upon, and expect, content delivery over a variety of network conditions.

Although advances continue to be made in the areas of battery technology and hardware efficiency, these advances do not directly address the users' experience when a mobile device is operating under power constraints. As a consequence, the current mobile device power management techniques are not adequate to meet user expectations and will almost certainly not be satisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a method for managing power on a mobile device, and the method may include sending a request to a web server for content and receiving, from the web server, responsive to the request for the content, a device-capability-inquiry. In addition, the mobile device provides, responsive to the device-capability-inquiry, an indication of an amount of power that is available on the mobile device, and the web server modifies the requested content based upon the amount of power that is available on the mobile device.

Another embodiment of the invention may be characterized as a mobile communication device that includes a browser configured to enable a user to request content and a plurality of transceivers that are each configured to communicate with a corresponding one of a plurality of network types. In addition, the mobile communication device includes a cache for caching the requested content and a power source configured to provide power to components of the mobile communication device. A network selection component of the mobile communication device is configured to select a particular one of the plurality of transceivers for communication based upon a power capability of the power source and a quality of service of each of the plurality of network types, and a cache management component is configured to increase, based upon a decrease in the power capability of the power source, a size of the cache that is available for the requested content so as to increase a likelihood that a subsequent request for the content will be loaded from the cache.

Yet another embodiment of the invention may be characterized as a mobile device that includes means for receiving a request for web content from a user and a plurality of transceivers that are each configured to communicate with a corresponding one of a plurality of network types. The mobile device also includes cache means for caching the requested web content and means for providing an indication of a power capability of the mobile device. In addition, the mobile device includes means for selecting a particular one of the plurality of transceivers based upon the power capability of the mobile device and a quality of service associated with each of the plurality of network types. And the mobile device also includes means for increasing, based upon an indication of a decrease in the power capability of the mobile device, a size of the cache means so as to increase a likelihood that subsequent requests for the web content will be loaded from the mobile device.

And another embodiment of the invention may be characterized as a non-transitory, tangible computer readable storage medium, encoded with processor readable instructions to perform a method for managing power on a mobile device. The method includes receiving a user-request for content that is located at a remote location from a mobile device; accessing, in advance of requesting the content from the remote location, a QoS-power database that includes, for each of a plurality of network options, quality of service and power information. In addition, the method includes determining a quality of service that is desired to obtain the content from the remote location and selecting, from among the plurality of network options, a particular network that requires a minimum amount of device power to achieve the quality of service that is desired to obtain the content from the remote location.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
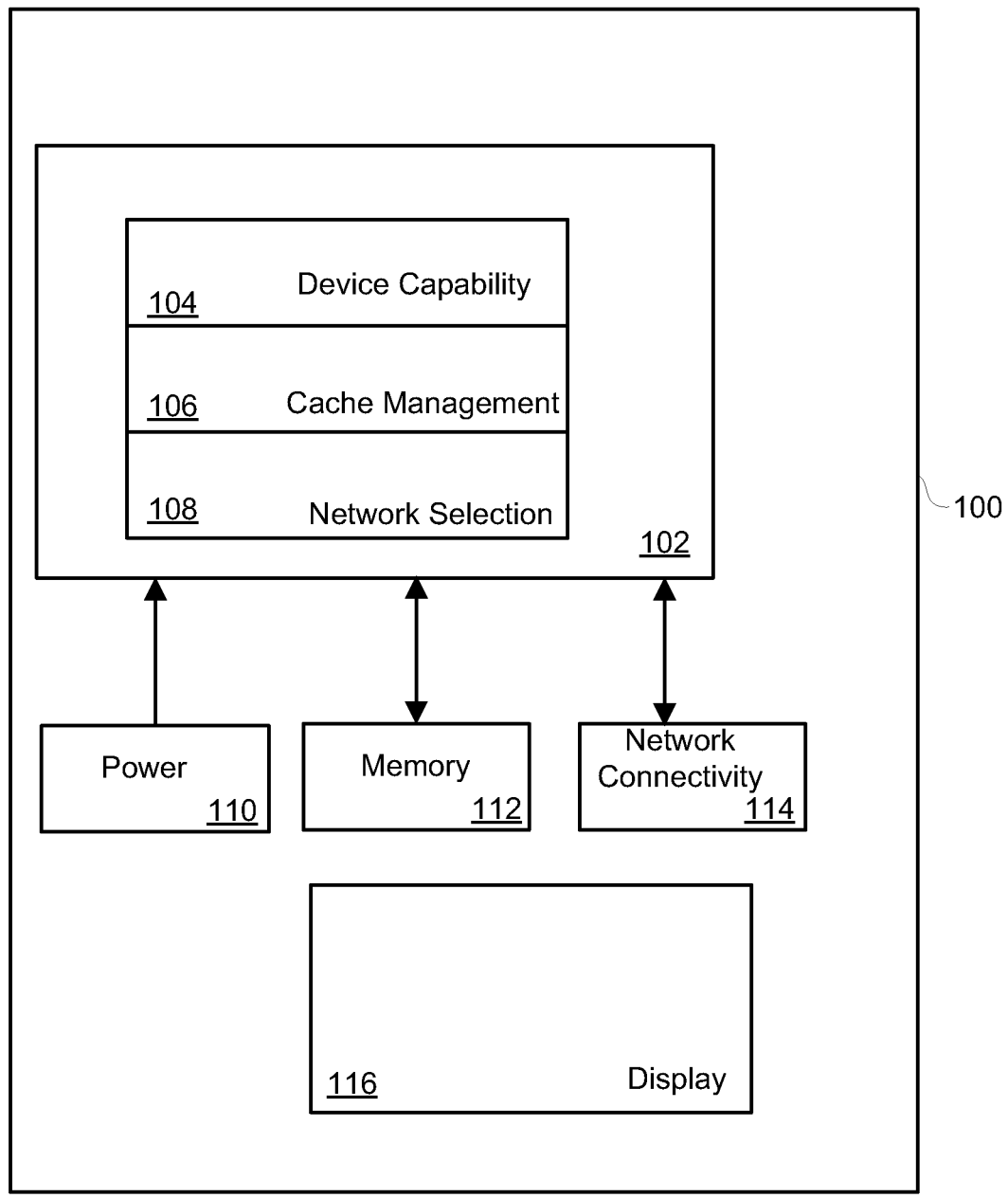
FIG. 1 is a block diagram depicting the functional components of an exemplary mobile device according to an embodiment of the invention.

Referring next to FIG. 1, shown is a block diagram depicting functional components of an exemplary mobile device 100 according to an embodiment of the invention. As shown, the mobile device 100 includes an application 102 that includes a device capability component 104, a cache management component 106, and a network selection component 108. In addition, the application 102 is in communication with a power module 110, memory 112, and a network connectivity component 114, and the mobile device 100 also includes a display 116.

The illustrated arrangement of these components is logical, the connections between the various components are exemplary only, and the depiction of this embodiment is not meant to be an actual hardware diagram; thus one of ordinary skill in the art will readily appreciate that the components can be combined or further separated and sub-divided in an actual implementation, and the components can be connected in a variety of ways without changing the basic operation of the system. Moreover, components may be removed and/or supplemented so that more or less components can be utilized in any particular implementation.

For example, one or more of the device capability component 104, cache management component 106, and a network selection component 108 may be realized as separate components from the application 102. And as discussed further herein, only one or two of the device capability component 104, cache management component 106, and network selection component 108 are implemented in some embodiments. Moreover, the depicted components may be integrated to such an extent that it is difficult to identify separable components or modules.

The mobile device 100 may be realized by a variety of devices including smartphones, netbooks, gaming devices, digital cameras, and PDAs that rely on a limited energy source that resides on the mobile device 100. The application 102 in this embodiment generally operates, in connection with the display 116, to present content to a user. As discussed further herein, the application 102 may obtain content from remote sources (e.g., web servers) and utilize the memory 112 to cache portions of the received content for later use. For example, the application 102 may be realized by a web browser or any one of a variety of applications that receive and present content to the user.

In general, the device capability component 104, cache management component 106, and network selection component 108 each affect a corresponding operation of the mobile device 100 based upon an indication, from the power component 110, of a power capability of the mobile device 100. In general, the power capability of the mobile device 100 is an indication of the extent to which the mobile device 100 is capable, relative to power constraints, of carrying out its functions. For example, the power capability may be characterized in terms of a measure of the ability of an energy source (e.g., battery) on the mobile device 100 to apply a particular level of power for a particular amount of time. Alternatively, the power capability may characterized in terms of a measure of the energy (e.g., in terms of milliamp-hours ((mAh)) available (e.g., in a battery) on the mobile device 100 (e.g., a measure of available energy or a percentage of maximum available energy).

The power component 110 may be realized by a combination of hardware and software, and although not required, may utilize one or more known operating system API calls to obtain power capability information. The implementation of the power component 110 is well known to those of ordinary skill in the art; thus addition details of the power component 110 are not included for clarity.

The device capability component 104 is generally configured to operate in connection with a remote server (e.g., web server) so that the content that is sent by the remote server is modified based upon the power capability of the mobile device 100. More specifically, the device capability component 104 communicates an indication of the power capability of the mobile device 100 in advance of the mobile device 100 loading the content, and the remote server modifies the content based upon the indication of the power capability of the mobile device 100. For example, if the power capability of the mobile device 100 falls below one or more thresholds, the remote server provides content that is modified so as to include less data. As another example, the remote server may send video content at one or more resolution levels depending upon the power capability of the mobile device 100 (e.g., video resolution may decrease as available power decreases).

The cache management component 106 generally operates to increase a size of memory, within the memory component 112, that is available for caching data based upon the power capability of the mobile device 100 so that the likelihood that requested content (e.g., a webpage) will be loaded from the mobile device 100 (as opposed to a remote server) increases as the power capability of the mobile device 100 decreases. As a consequence, when the power capability of the mobile device 100 is reduced, the likelihood that the power-intensive radio/network components of the mobile device 100 will be utilized to retrieve the content is also reduced. In addition, in some variations, when network conditions adversely affect the ability of the mobile device 100 to retrieve content from a remote location, the cache size is increased so as to increase the likelihood that requested content is available on the handset; thus improving the user's experience.

The network selection component 108 generally functions to select, from among two or more available networks, a network based upon the power capability of the mobile device 100 as well the quality of service (QoS) available from the available networks. In many implementations, for example, if a minimum QoS is desired for content delivery, and two or more networks are capable of providing the minimum desired QoS, the network selection component 108 selects the network that requires the least amount of power to retrieve the content with the minimum desired QoS. This is merely an example, however, and the network selection component 108 may be configured by the user in a variety of ways (e.g., to use particular networks when operating under particular power conditions).

The depicted network connectivity component 114 generally functions to provide selectable network connectivity (e.g., via selectable wireless networks) to the network selection component 108 and the application 102, and the network connectivity component 114 may be realized by several components including software-implemented logic and hardware that may include multiple transceiver chains and associated processing components that are well known to one of ordinary skill in the art, but are not depicted for clarity.

Figure 2:
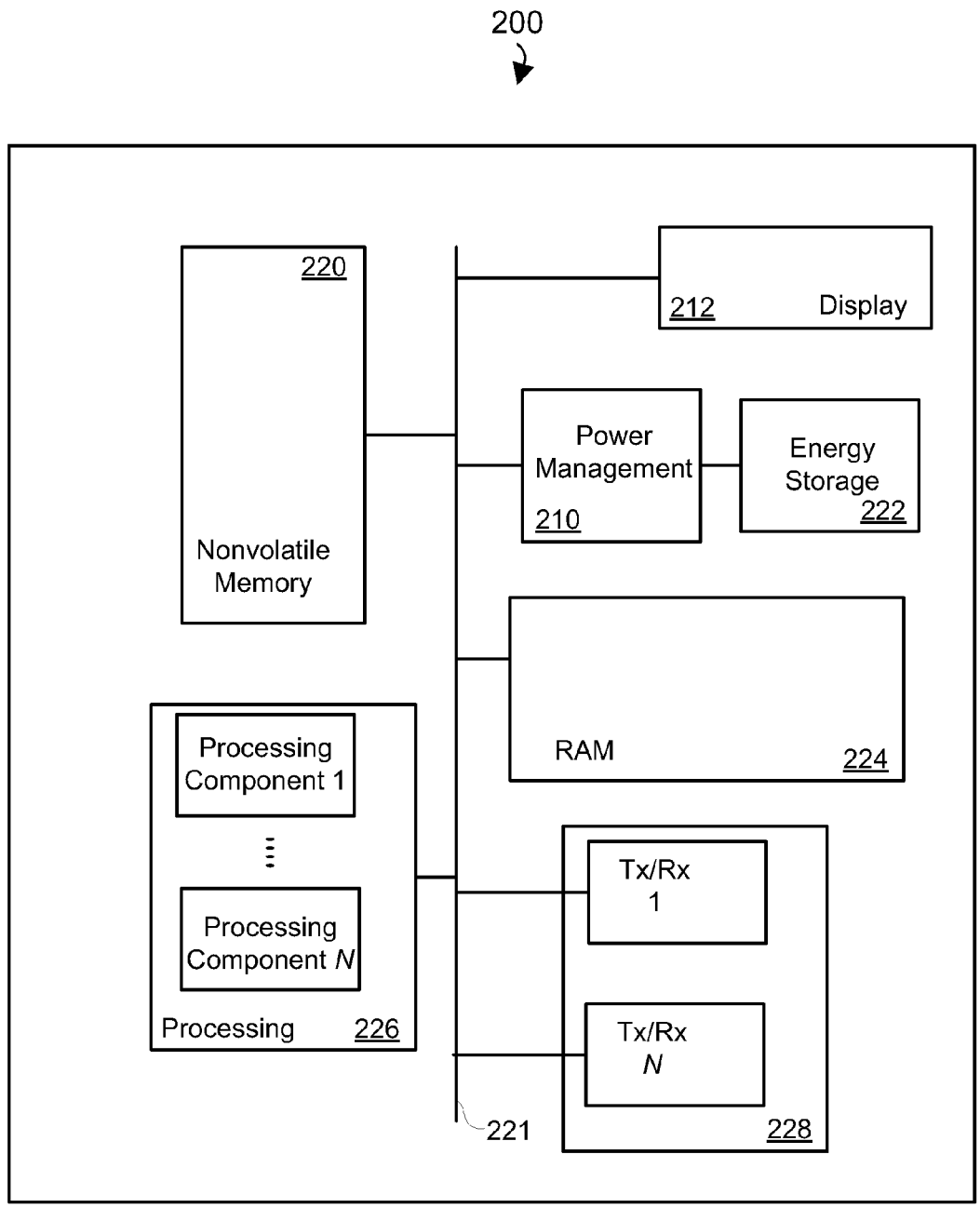
FIG. 2 is a block diagram depicting physical components that may be used to realize the functional components depicted in FIG. 1.

Referring next to FIG. 2, shown is a block diagram depicting physical components of an exemplary embodiment of a mobile device 200. As shown, a power management component 210, display portion 212, and nonvolatile memory 220 are coupled to a bus 221 that is also coupled to random access memory ("RAM") 224, a processing portion (which includes N processing components) 226, and a transceiver component 228. Also shown is an energy storage portion 222 that is coupled to the power management component 210. Although the components depicted in FIG. 2 represent physical components of the mobile device 200 it is not intended to be a hardware diagram; thus many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 1.

In general, the nonvolatile memory 220 functions to store (e.g., persistently store) data and executable code including code that is associated with the functional components depicted in FIG. 1. In some embodiments for example, the nonvolatile memory 220 includes bootloader code, modem software, operating system code, file system code, and processor-executable code to facilitate the implementation of one or more portions of the device capability component 104, cache management component 106, and network selection component 108.

In many implementations, the nonvolatile memory 220 is realized by flash memory (e.g., NAND or ONENAND™ memory), but it is certainly contemplated that other memory types may be utilized as well. Although it may be possible to execute the code from the nonvolatile memory 220, the executable code in the nonvolatile memory 220 is typically loaded into RAM 224 and executed by one or more of the N processing components in the processing portion 226.

The power management component 210 in the embodiment depicted in FIG. 2 generally operates to provide power capability information based upon a status of the energy storage portion 222. In addition, the power management component 210 may operate as a power source to regulate the application of power to hardware components of the mobile device 200 and regulate charging of the energy storage portion 222. In many implementations the energy storage portion 222 includes one or more rechargeable batteries (e.g., lithium-ion batteries), but it is certainly contemplated that the energy storage portion 222 may include other types of energy storage technologies (e.g., fuel cell or other technologies). The power capability information may include an indication of the amount of energy (e.g., in milliampere-hours (mAh)) that is available in the energy storage portion 222.

The N processing components 226 in connection with RAM 224 generally operate to execute the instructions stored in nonvolatile memory 220 to effectuate functional components depicted in FIG. 1. As one of ordinarily skill in the art will appreciate, the processing components 226 may include a video processor, modem processor, DSP, graphics processing unit (GPU), and other processing components.

The depicted transceiver component 228 includes N transceiver chains, which may be used in connection with the network connectivity component 114 to communicate with a variety of types of networks. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a unitary transceiver component 228 for simplicity, it is certainly contemplated that the transceiver chains may be separately disposed about the mobile device 200.

The display 212 generally operates to provide visual images to a user that may include a user interface and content that is received in connection with many embodiments of the present invention. Although not depicted for clarity, one of ordinary skill in the art will appreciate that other components including a display driver and backlighting (depending upon the technology of the display) are also associated with the display 212.

Figure 3:
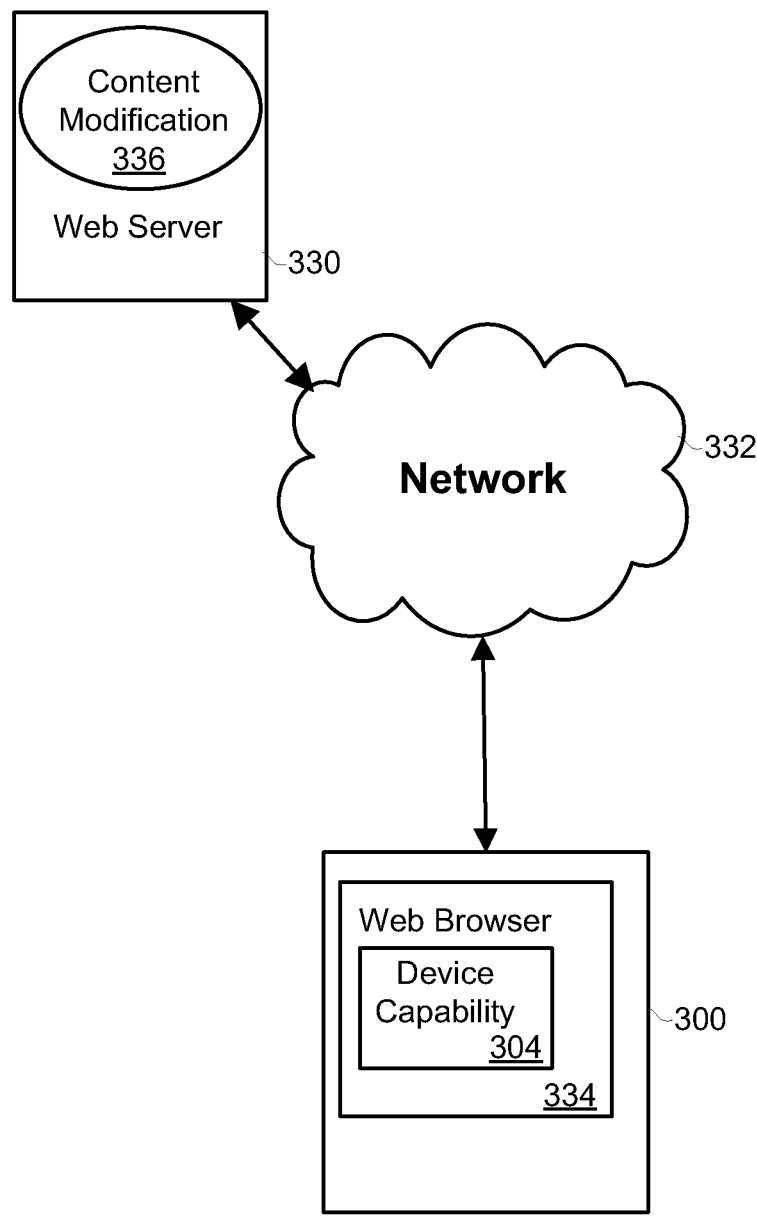
FIG. 3 is a diagram depicting an exemplary system according to an embodiment of the present invention.

Referring next to FIG. 3, it is a depiction of an exemplary system in which a device capability component 304 is implemented on a mobile device 300 in connection with a web browser 334. As depicted, the mobile device 300 is in communication with a remote web server 330 via a network 332, and in addition, the web server 330 is coupled to a content modification component 336.

Figure 4:
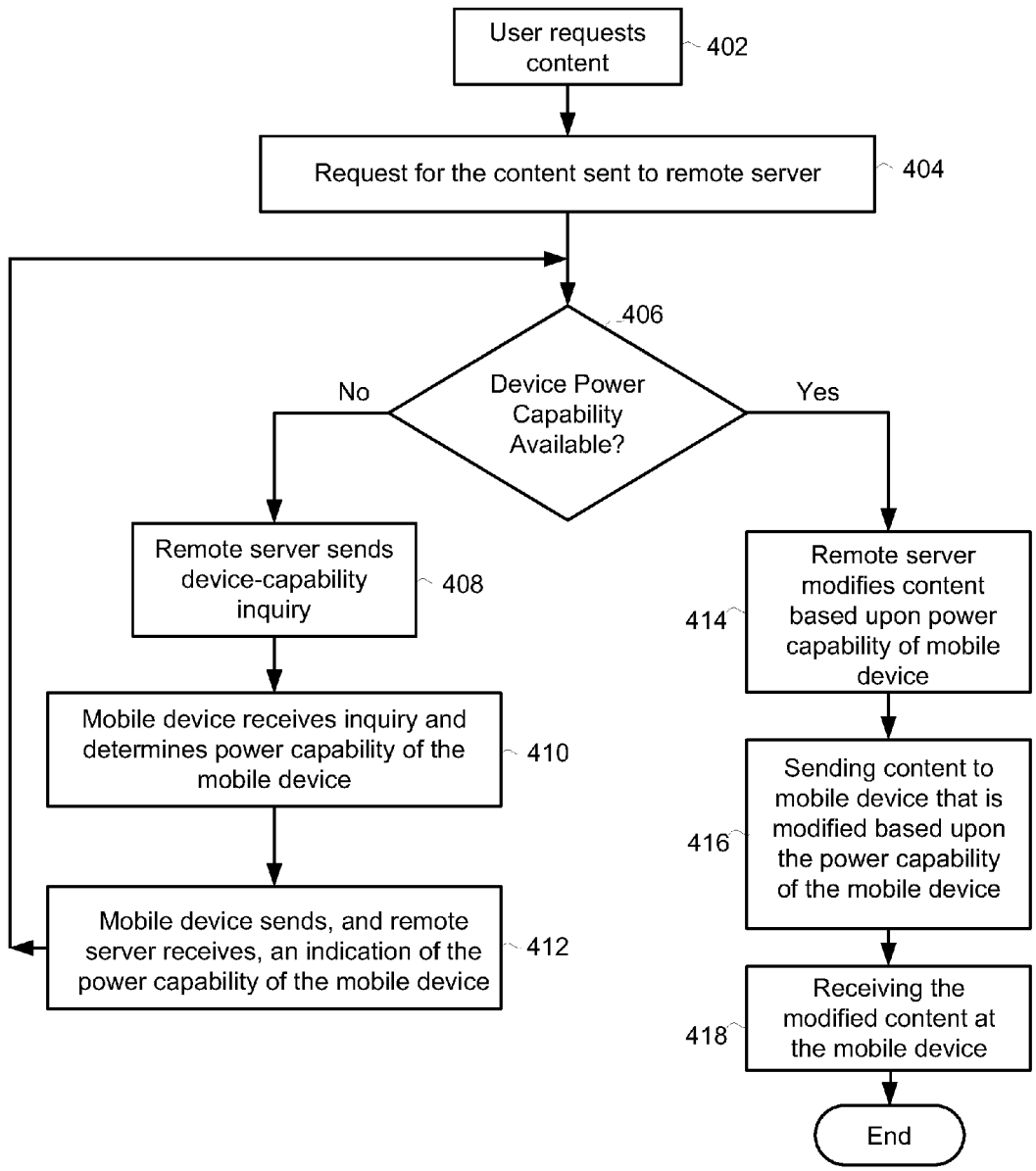
FIG. 4 is a flowchart that depicts a method that may be carried out in connection with the embodiment described with reference to FIG. 3.

While referring to FIG. 3, simultaneous reference will be made to FIG. 4, which is a flowchart depicting steps that may be traversed in connection with the embodiment depicted in FIG. 3. As shown, when a user requests content (e.g., using the web browser 334) (Block 402), the request for the content is sent to the remote web server 330 (Block 404). As depicted in FIG. 4, if the remote server 330 has not received an indication of the power capability from the mobile device (Block 406), responsive to the user's request for content, the remote server 330 sends a device-capability inquiry to the mobile device 300 (Block 408). And when the mobile device 300 receives the device-capability inquiry, the mobile device 300 determines the power capability of the mobile device 300 (Block 410). Once the mobile device 300 has determined its power capability (Block 410), the mobile device 300 sends an indication of the device's power capability to the remote server 330 (Block 412).

In many implementations, the device-capability inquiry from the remote server 330 is sent as a device-capability-inquiry-script, which obtains power capability information from the mobile device 300, and the mobile device 300 sends back an XMLhttpRequest (XHR) to the remote server 330 along with the script execution results, which indicate the power capability (e.g., in terms of mAh) of the mobile device.

As depicted, once the remote server 330 has received the indication of the power capability (Block 406), the content modification component 336 of the web server 330 modifies the requested content based upon the indication of the power capability of the mobile device 300 (Block 414), and the remote server 330 sends the modified content to the mobile device 300 (Block 416), which receives the modified content (Block 418).

The content modification component 336 may modify the content that is sent to the mobile device 300 based upon an extent that the power capability of the mobile device has decreased from a nominal (e.g., fully charged) level. And based upon the power capability information, that content may be modified to include less data (e.g., media objects may be removed); a text font that requires less power to display may be utilized; and the resolution of one or more portions of the content (e.g., video resolution) may be reduced as the device capability falls. It should be recognized that these are merely examples of techniques for potentially modifying the content and that other techniques may be utilized as well.

Figure 5:
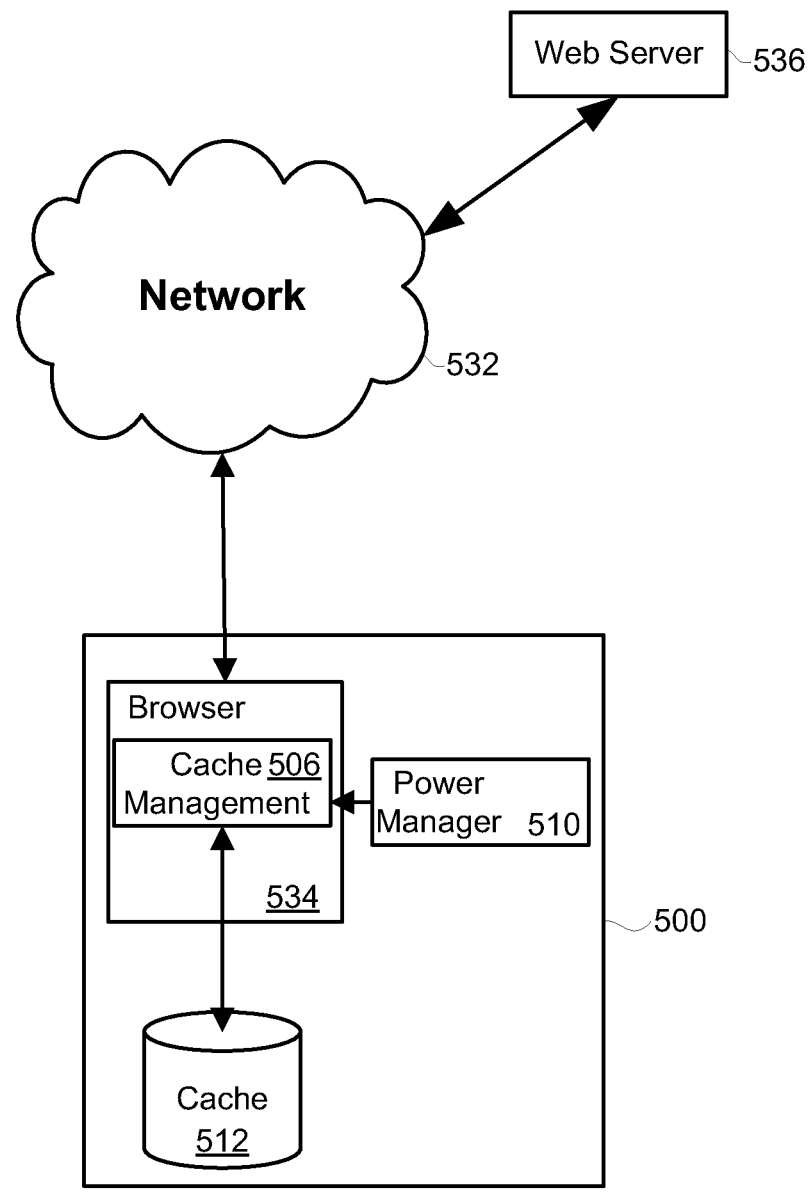
FIG. 5 is a diagram depicting another exemplary system according to another embodiment of the present invention.

Referring next to FIG. 5, shown is an exemplary system in which a cache management component 506 is implemented as a component of a web browser 534 on a mobile device 500. As shown, the web browser 534 is in communication with a web server 536 via a network 532, and the cache management component 506 is in communication with a power manager 510 and a cache 512 of the mobile device 500. While referring to FIG. 5, simultaneous reference will be made to FIG. 6, which is a flowchart depicting steps that may be carried out in connection with embodiment depicted in FIG. 5.

Figure 6:
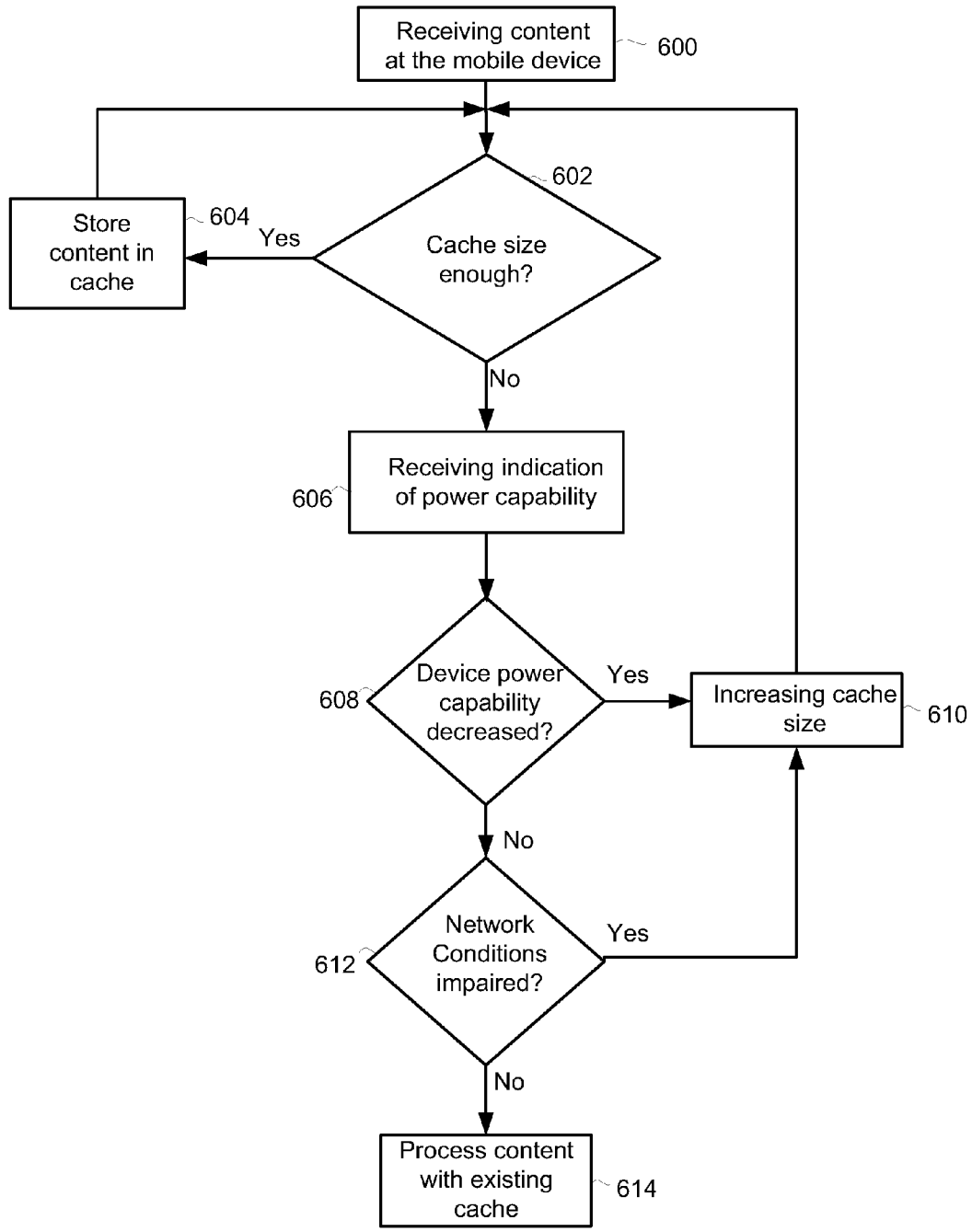
FIG. 6 is a flowchart that depicts a method that may be carried out in connection with the embodiment described with reference to FIG. 5.

As shown in FIG. 6, when content (e.g., from the web server 536) is received at the web browser 534 (Block 600), if the cache management component 506 determines the cache 512 is large enough for the received content (Block 602), the content is then stored in the cache 512 (Block 604), but if the cache 512 is not large enough (Block 602), then the cache management component 506 receives an indication of the power capability of the mobile device 500 from the power manager 510 (Block 606).

As shown, if the power capability of the mobile device 500 drops below one or more thresholds (Block 608), then the size of the cache 512 is increased (Block 610) so as to increase the likelihood that the cache 512 will be large enough (Block 602) to store the content in the cache 512 (Block 604), and as a consequence, the likelihood that the content will be available on the mobile device 500 (in the cache 512) is also increased. Thus, when the power capability of the device 500 is reduced so that the device 500 is unable to retrieve the stored content from the remote server 536 (or it is undesirable to expend the energy to do so) the user in many instances will still be able to access the cached content.

In some implementations, if the power capability of the mobile device 500 has been reduced by a configurable step (e.g., 5% or 10%), the cache management component 506 increases the cache size by a corresponding step (e.g., 20% or 25%). But in many embodiments, the extent that the size of the cache 512 is increased depends upon one or more constraints such as whether another higher priority application is using the cache 512 and/or configurable user preferences that limit changes to the size of the cache 512.

Although not required, in many modes of operation, if the power capability of the mobile device 500 has not fallen below any threshold (Block 608), but network conditions are impaired, (Block 612), then the size of the cache 512 is increased (Block 610) so that when a user attempts to access the content at a later time, the content need not be obtained from the web server 536 using the impaired network conditions. In many modes of operation for example, as the download rate decreases and/or the round trip delay (RTD) increases, the size of the cache 512 increases.

As depicted, in some modes of operation, if neither the power capability of the mobile device 500 has fallen below a threshold (Block 608) nor the network conditions have been sufficiently impaired (Block 612), then the content is processed with the existing cache size (Block 614).

Figure 7:
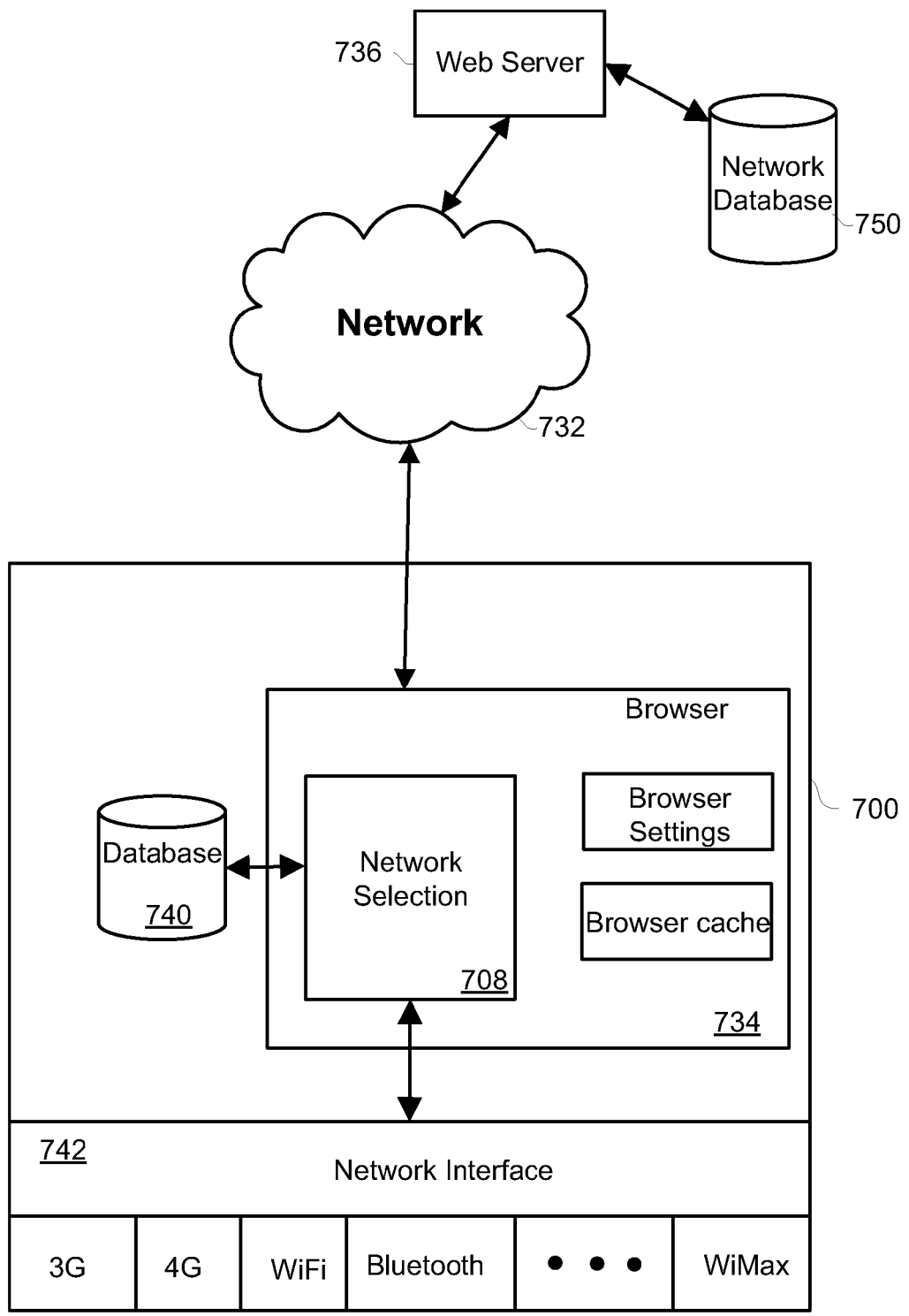
FIG. 7 is a diagram depicting yet another exemplary system according to yet another embodiment of the present invention.

Referring next to FIG. 7, shown is an exemplary system in which a network selection component 708 is implemented in connection with a web browser 734 on a mobile device 700. As shown, the network selection component 708 in this embodiment is in communication with a network database 740 (also referred to herein as a QoS-power database 740) and a network interface 742, which includes N communication components (where N is equal to two or more) for communicating with each of N types of wireless networks. As depicted in FIG. 7, the N communication components may include 3G, 4G, WiFi, Bluetooth, and WiMax communication components, but these types of network components are only exemplary and it is contemplated that other components that are utilized in connection with other types of communication protocols may also be implemented.

The network database 740 in this implementation includes data that maps, for each of the N types of wireless networks, a quality of service (QoS) level with a corresponding power level. In some implementations, the data in the network database 740 is static and populated in advance based upon studies that determine the level of power that is required for a particular communication network and QoS. But in other implementations, the network database 740 may be dynamically configured and updated (e.g., with more complete or more accurate data). As shown in FIG. 7, updated data may be retrieved from a remote network database 750 via a network connection 732 to a web server 736.

Figure 8:
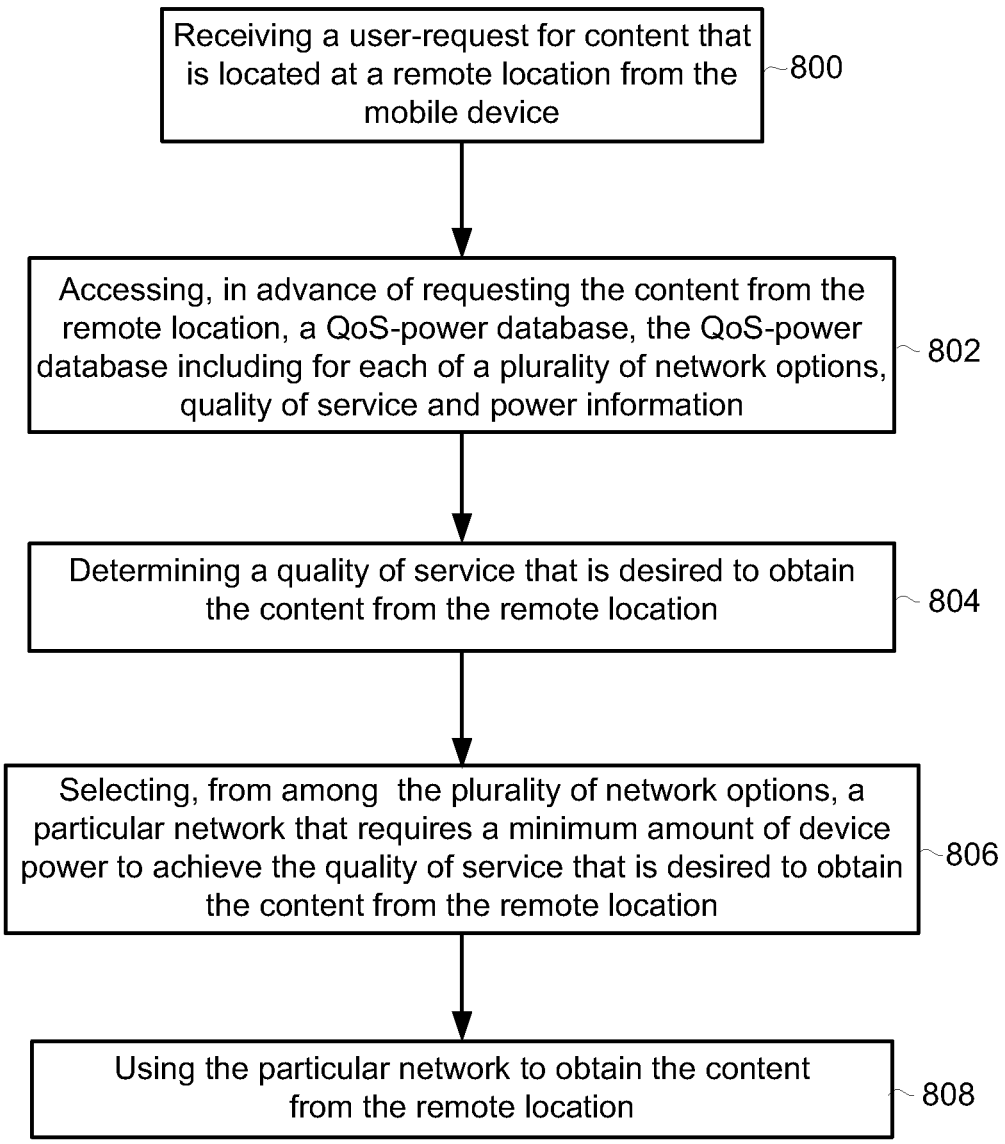
FIG. 8 is a flowchart that depicts a method that may be carried out in connection with the embodiment described with reference to FIG. 7.

While referring to FIG. 7, simultaneous reference is made to FIG. 8, which is a flowchart depicting an exemplary method that be carried out in connection with the embodiment depicted in FIG. 7. As shown, when a user requests content from a remote location (e.g., from the web server 736) (Block 800), the network selection component 708 accesses, in advance of requesting the content from the remote location, the QoS-power data in the network database 740 to obtain QoS and power information for at least two of the wireless networks that are available (Block 802).

As shown, the network selection component 708 then determines a QoS that is desired to obtain the content from the remote location (Block 804), and selects, from among the available wireless networks, a particular wireless network that requires less power than other networks to achieve the QoS that is desired to obtain the content from the remote location (Block 806), and the selected wireless network is utilized to obtain the content from the remote location (Block 808).

In many modes of operation, if the power capability of the device is above a threshold level (e.g., a default threshold or user-configurable threshold), the network selection component 708 gives preference to QoS over power considerations so that the wireless network with the highest QoS is selected, and as a consequence, the user experience is maintained at a high level.

In conclusion, embodiments of the present invention enable a mobile device to alter operations of one or more of its components based upon a power capability of the mobile device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for managing power on a mobile device, the method comprising:
receiving a user-request for content that is located at a remote location from the mobile device;
accessing, in advance of requesting the content from the remote location, a quality of service (QoS) power database, the quality of service power database including for each of a plurality of network options, quality of service and power information;
determining a quality of service that is desired to obtain the content from the remote location;
selecting, from among the plurality of wireless networks, a particular wireless network that requires a minimum amount of device power to achieve the quality of service that is desired to obtain the content from the remote location;

using the particular wireless network to obtain the content from the remote location;

caching, if a size of memory available for a browser cache is sufficient, a portion of the content that is cachable; and increasing, based upon an indication of a decrease in an amount of power that remains available on the mobile device, the size of the memory that is available for the browser cache that is available for the content that is cachable to increase a likelihood that a subsequent request for the content will be loaded from the browser cache.

2. The method of claim 1, including:

utilizing, if the mobile device is capable of applying a power level associated with a higher quality of service than the desired quality of service, the higher quality of service to obtain the content from the remote location.

3. The method of claim 2, wherein utilizing the higher quality of service is an option that is configurable so that the mobile device may be configured to utilize either the minimum amount of device power to achieve the desired quality of service or the higher quality of service if the mobile device is capable of applying the power level associated with the higher quality of service.

4. The method of claim 1, including:

dynamically configuring the QoS-power database.

5. A mobile device including:

a browser configured to enable a user to request content that is located at a remote location from the mobile device;

a plurality of transceivers, each of the transceivers configured to communicate with a corresponding one of a plurality of wireless networks;

a memory for caching the requested content;

a power source configured to provide power to components of the mobile device;

a network selection component configured to:
  access, in advance of requesting the content from the remote location, a quality of service (QoS) power database, the quality of service power database including for each of the plurality of wireless networks, quality of service and power information;
  determine a quality of service that is desired to obtain the content from the remote location;
  select a particular one of the plurality of wireless networks for communication that requires a minimum amount of mobile device power to achieve the quality of service that is desired to obtain the content from the remote location; and
  use the particular wireless network to obtain the content from the remote location; and a cache management component configured to increase, based upon an indication of a decrease in an amount of power that remains available on the mobile device, the size of the memory that is available for the browser cache that is available for the content that is cachable to increase a likelihood that a subsequent request for the content will be loaded from the browser cache.

6. The mobile device of claim 5, including:

a device capability component configured to receive device-capability inquiries from a remote server and provide, responsive to each of the device-capability inquiries, an indication of the power capability of the power source so as to enable the remote server to modify the requested content based upon the power capability of the power source.

7. The mobile device of claim 6, wherein the device capability component is configured to receive and initiate execution of a device-capability-inquiry-script that collects the indication of the power capability, and the device capability component is configured to provide to the remote server, responsive to the device-capability-inquiry-script, the indication of the power capability via an extensible markup language hypertext transfer protocol request.

8. The mobile device of claim 5, wherein the a plurality of transceivers include transceivers corresponding to network types selected from the group consisting of 3G, 4G, WiFi, Bluetooth, and WiMax protocols.

9. A mobile device including:

means for receiving a user-request for content that is located at a remote location from the mobile device;

means for accessing, in advance of requesting the content from the remote location, a quality of service (QoS) power database, the quality of service power database including for each of a plurality of wireless networks, quality of service and power information;

means for determining a quality of service that is desired to obtain the content from the remote location;

means for selecting, from among the plurality of wireless networks, a particular wireless network that requires a minimum amount of device power to achieve the quality of service that is desired to obtain the content from the remote location;

means for using the particular wireless network to obtain the content from the remote location;

means for caching, if a size of memory available for a browser cache is sufficient, a portion of the content that is cachable; and means for increasing, based upon an indication of a decrease in an amount of power that remains available on the mobile device, the size of the memory that is available for the browser cache that is available for the content that is cachable to increase a likelihood that a subsequent request for the content will be loaded from the browser cache.

10. The mobile device of claim 9, including:

means for receiving device-capability inquiries from a remote server and providing, responsive to each of the inquiries, the indication of the power capability of the mobile device so as to enable the remote server to modify the requested web content based upon the power capability of the mobile device.

11. A non-transitory, tangible computer readable storage medium, encoded with processor readable instructions to perform a method for managing power on a mobile device, the method comprising:

receiving a user-request for content that is located at a remote location from the mobile device;

accessing, in advance of requesting the content from the remote location, a quality of service (QoS)-power database, the QoS-power database including for each of a plurality of network options, quality of service and power information;

determining a quality of service that is desired to obtain the content from the remote location;

selecting, from among the plurality of wireless networks, a particular wireless network that requires a minimum amount of device power to achieve the quality of service that is desired to obtain the content from the remote location; and using the particular wireless network to obtain the content from the remote location caching, if a size of memory available for a browser cache is sufficient, a portion of the content that is cachable; and increasing, based upon an indication of a decrease in an amount of power that remains available on the mobile device, the size of the memory that is available for the browser cache that is available for the content that is cachable to increase a likelihood that a subsequent request for the content will be loaded from the browser cache.

12. The non-transitory, tangible computer readable storage medium of claim 11, including encoded processor readable instructions to:

cache, if a browser cache is sufficient, at least a portion of the content;

increasing, based upon an indication of a decrease in an amount of power that remains available on the mobile device, a size of the browser cache that is available for the content that is cachable so as to increase a likelihood that a subsequent request for the content will be loaded from the mobile device.

13. The non-transitory, tangible computer readable storage medium of claim 12, including encoded processor readable instructions to:

decrease the size of the browser cache if another application requests memory associated with the browser cache.

14. The non-transitory, tangible computer readable storage medium of claim 12, wherein increasing includes increasing the size of the browser cache by a configurable step in an inverse relation to a decrease in the amount of power that is available on the mobile device.

15. The non-transitory, tangible computer readable storage medium of claim 11, including encoded processor readable instructions to:

send, from the mobile device, a request to a web server for the content;

receive, from the web server, responsive to the request for the content, a device-capability-inquiry;

provide, responsive to the device-capability-inquiry, an indication of an amount of power that is available on the mobile device; and receive, from the web server, the requested content that is modified based upon the amount of power that is available on the mobile device.

16. The non-transitory, tangible computer readable storage medium of claim 11, including encoded processor readable instructions to:

utilize, if the mobile device is capable of applying power associated with a higher quality of service than the desired quality of service, the higher quality of service to obtain the content from the remote location.

17. The non-transitory, tangible computer readable storage medium of claim 16, wherein utilizing the higher quality of service is an option that is configurable so that the mobile device may be configured to utilize either the minimum amount of device power to achieve the quality of service that is desired or the higher quality of service.

18. The non-transitory, tangible computer readable storage medium of claim 11, including encoded processor readable instructions to:

dynamically configure the quality of service power database.

\* \* \* \* \*